June 24, 1930.  J. HETHERINGTON  1,766,171
MIXING TOOL
Filed Sept. 1, 1927
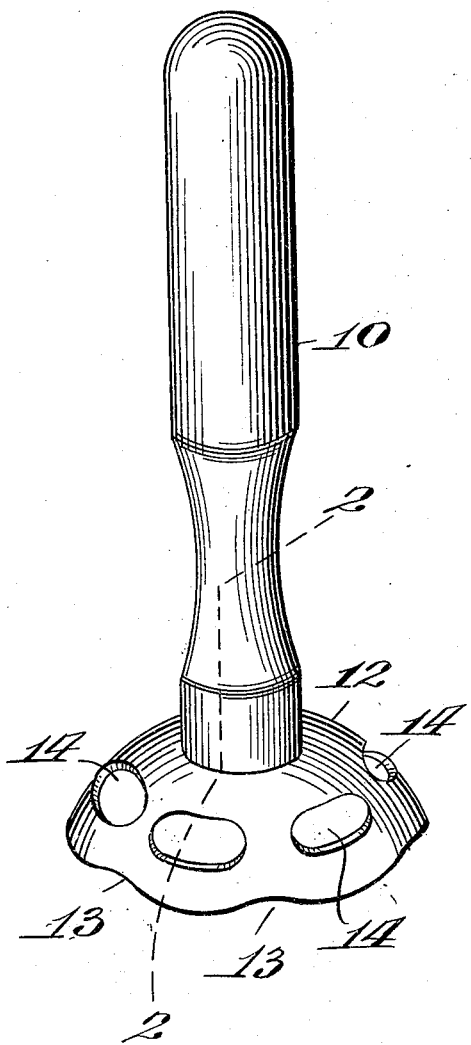
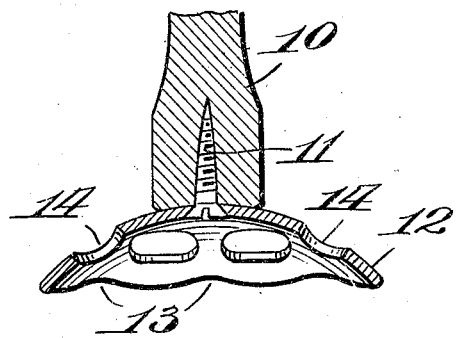
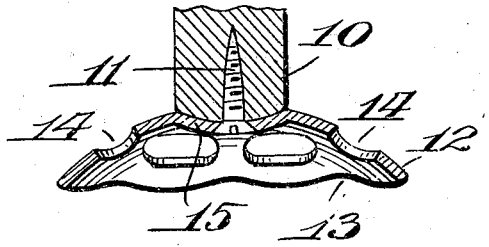
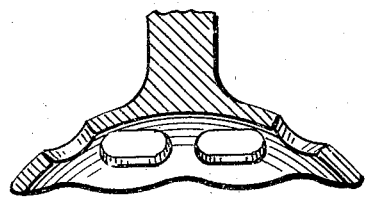
INVENTOR,
John Hetherington
By Martin Smith, Atty.

Patented June 24, 1930

1,766,171

UNITED STATES PATENT OFFICE

JOHN HETHERINGTON, OF LOS ANGELES, CALIFORNIA

MIXING TOOL

Application filed September 1, 1927. Serial No. 216,865.

My invention relates to a mixing device, that is particularly designed for use in mixing coloring matter with oleomargarine, although said device may be conveniently employed for mixing any liquid, semi-liquid or plastic materials or products, or for mashing potatoes, crushing fruits, or other work of a similar nature.

Further objects of my invention are, to provide a mixing device of the character referred to, that is relatively simple in construction, inexpensive of manufacture, and which will be very effective in performing the functions for which it is intended.

With the foregoing and other objects in view, my invention consists in certain novel features of construction and arrangement of parts that will hereinafter be more fully described and claimed and illustrated in the accompanying drawing, in which—

Fig. 1 is a perspective view of a mixing tool constructed in accordance with my invention.

Fig. 2 is a cross-section taken on the line 2—2 of Fig. 1.

Fig. 3 is a cross-section similar to Fig. 2, and showing a modified form of the device.

Fig. 4 is a cross-section similar to Figs. 2 and 3, and showing a further modified form of the mixing tool.

Referring by numerals to the accompanying drawings, which illustrate a practical embodiment of my invention, 10 designates a short handle that may be formed of wood, metal, hard rubber, or the like, and secured in any suitable manner to the lower end of said handle, preferably by means of a centrally arranged screw 11, is a concavo-convex disc 12, preferably of metal, that is arranged with its convex surface uppermost.

The marginal edge of this disc is sinuous, or provided with spaced indentations 13, and formed through the body of the disc, between its edge and the space covered by the handle 10, is a series of apertures 14, which may be of any desired shape, although I prefer to form said apertures substantially oval, as illustrated.

As illustrated in the drawings the apertures 14 are disposed in radial alignment with those portions of the edge of disc 12 that projects outwardly between the indentations 13 and as a result of this arrangement the oleomargarine or other plastic product that is being mixed or crushed by the utensil will squeeze upwardly through the aperture 14 so as to form elongated portions of uniform shape that will unite with each other and with the adjacent portions of the body of the product in a plane above the disc and thereby produce a more thorough and uniform mixture. Furthermore by arranging the apertures in a radial alignment with the outwardly projecting portions of the sinuous edge the produce that is engaged by the disc as the same is pressed downwardly will be forced inwardly toward a point in line with the axis of the handle of the device and as a result said material will be compressed to a slight degree and consequently increasing the travel of those portions of the product that pass through the apertures 14. Further, by arranging the apertures 14 in staggered relation to the notches 13, the product that passes over the edges of the notches or indentations 13 as the device is moved downwardly will move inwardly to unite with the product that passes through the openings 14 before those portions of the product that pass the edges of the disc between the indentations unites with the product passing through the openings, thereby rendering the mixing operations more effective and capable of being accomplished very quickly and with little effort on the part of the operator.

In the use of my improved mixing device, the handle 10 is manually engaged and disc 12 is pressed upward upon the material or product to be mixed or crushed, and a portion of said material or product will, as a result of the downward pressure which forces upward through the apertures 14, and repeated downward pressing movements of the device on the material or product will result in the very rapid and thorough mixture of said material, or likewise a complete crushing or maceration of fruit, or the like.

In the mixing of coloring matter with oleomargarine, the latter may be pressed with the tool, and by turning or rotating the tool slightly at the same time it is pressed downward portions of the oleomargarine will be forced upward through the apertures 14, thereby forming patties or portions of attractive form, and which may be used in individual service on the dining table.

In Fig. 3, I have shown the central portion of the disc provided with a depression or slight downward projecting portion 15, and where such formation is used any tendency of the product or material that is acted upon by the device to accumulate and adhere to the central portion of the concave under surface of disc 12, is eliminated.

In Fig. 4, I have shown the concavo-convex disc formed integral with the handle, and where such construction is employed the entire device may be cast or molded from metal, glass, or earthenware.

Thus it will be seen that I have provided a relatively simple and inexpensive tool or device that may be advantageously employed in mixing and crushing operations, and particularly for the mixing of coloring matter with oleomargarine.

It will be understood that minor changes in the size, form and construction of the various parts of my improved mixing device may be made and substituted for those herein shown and described without departing from the spirit of my invention, the scope of which is set forth in the appended claims.

I claim as my invention,

1. In a mixing tool, comprising a concavo-convex disc provided with a sinuous edge, a handle secured to and projecting from the center of said disc, and there being a series of apertures formed in said disc between said handle and said sinuous edge.

2. In a mixing tool, a shallow concavo-convex disk provided with a sinuous edge, the center of said disk being provided with a depression, a handle having one end seated in said depression, a fastening device passing through the depressed portion of the disk for rigidly securing the same to said handle there being a circular row of substantially oval apertures formed through said disk between the sinuous edge thereof and the depressed central portion and said apertures being disposed in radial alignment with the projecting portions of the sinuous edge of said disc.

In testimony whereof I affix my signature.

JOHN HETHERINGTON.